May 5, 1936.   E. ÖMAN ET AL   2,039,444
METHOD OF CONCENTRATING LYES OBTAINED IN THE CELLULOSE INDUSTRY
Filed Feb. 21, 1931   2 Sheets-Sheet 1
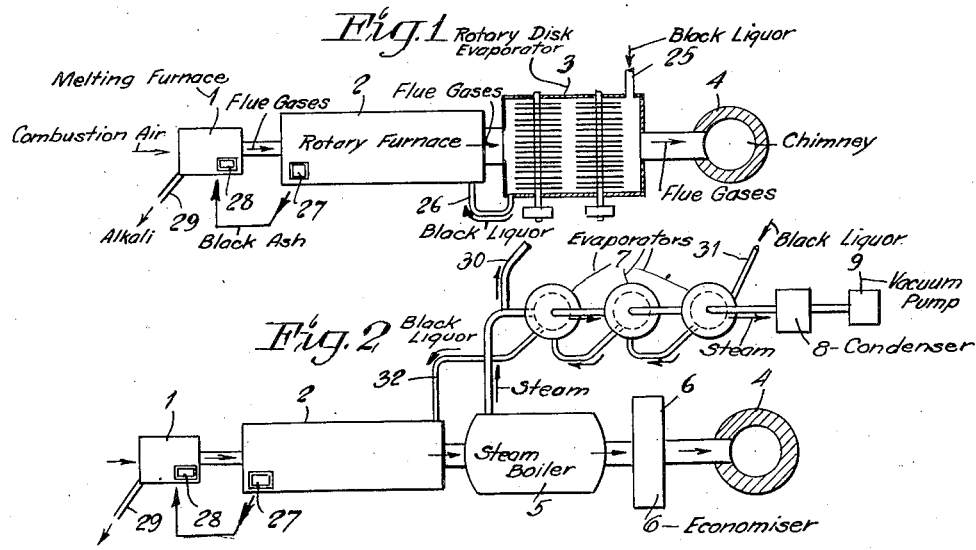
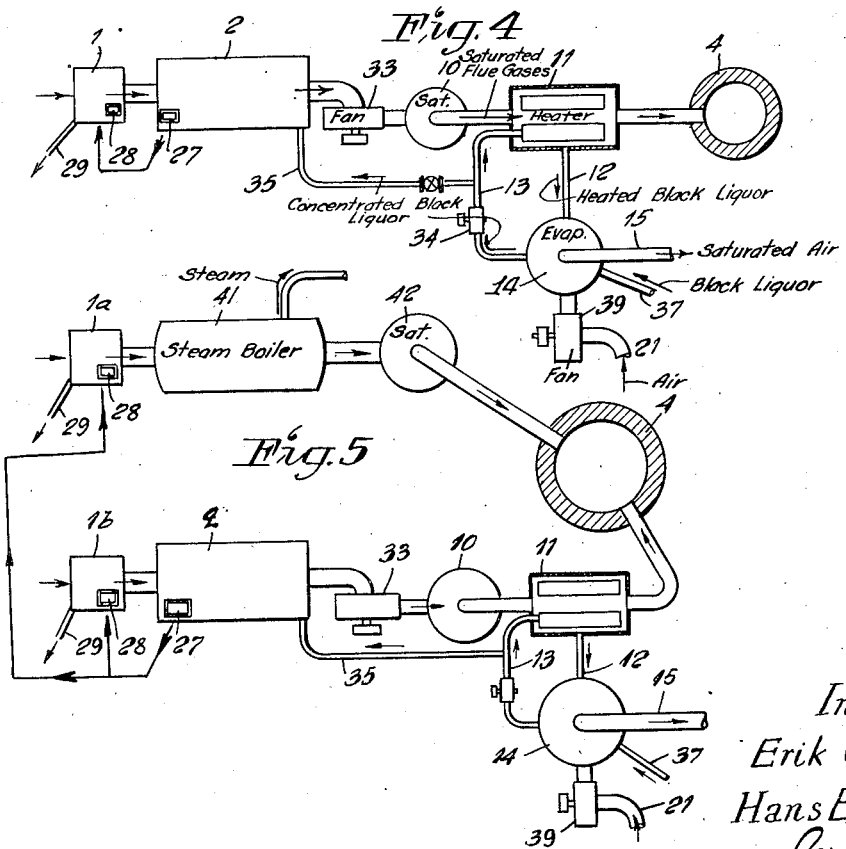
Inventors
Erik Öman
Hans E. A. Göth
per [signature]
Attorney

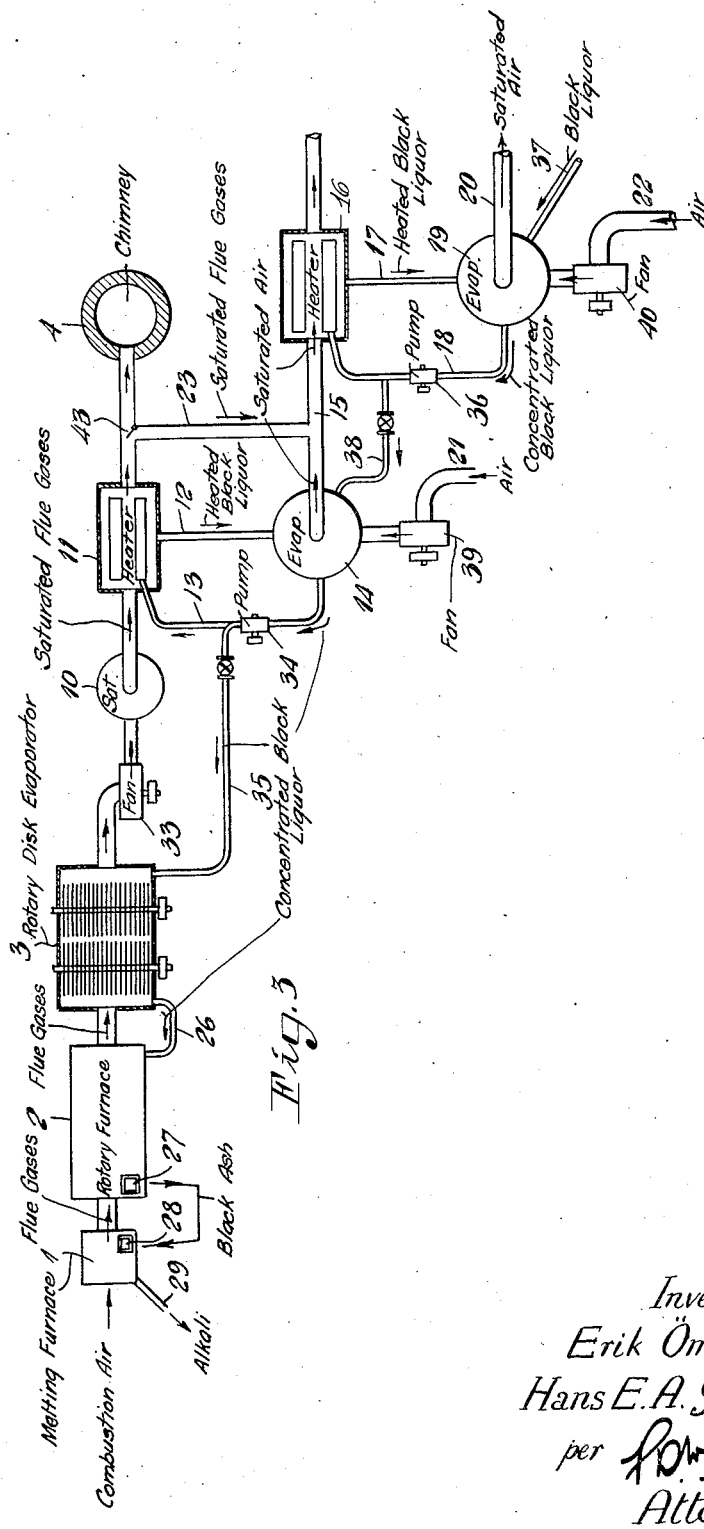

Patented May 5, 1936

2,039,444

UNITED STATES PATENT OFFICE 2,039,444

METHOD OF CONCENTRATING LYES OBTAINED IN THE CELLULOSE INDUSTRY

Erik Öman, Stocksund, and Hans Elis Abraham Göth, Stockholm, Sweden, assignors to Industrikemiska Aktiebolaget, Stockholm, Sweden, a corporation of Sweden Application February 21, 1931, Serial No. 517,544
In Sweden February 21, 1930

8 Claims. (Cl. 23—48)

On account of the great demand for steam within the cellulose industry heat economy constitutes an important feature in the operation of cellulose plants.

Particularly within the sulphate cellulose industry much work has been done toward reducing the fuel costs by suitable means.

It has been possible to effect some such reduction by utilization of the calorific value of the so-called black lye. The black lye contains the alkali employed in the digestion process, which alkali is recovered by evaporation and combustion of the black lye. In some plants, this evaporation is still effected solely with the aid of evaporators of the rotary disk type and in a rotating furnace with an appurtenant melting furnace. Here, the actual evaporation is effected by means of the rotating disks and in the rotating furnace, and the concentrated dry substance, the so-called brands, discharged from the rotating furnace is then combusted in the melting furnace. The evaporation takes place in the rotary furnace by utilization of the calorific value of the organic substance which the black lye itself contains. Under such circumstances the furnace is self-maintaining only in exceptional cases in so far as the fuel is concerned. Generally, some additional fuel must be supplied to the furnace.

Such an arrangement is shown diagrammatically in Fig. 1 of the accompanying drawings.

In this figure, 1 designates the melting furnace, 2 the rotary furnace, 3 the disk evaporators and 4 the chimney. The lye is supplied to the disk evaporators 3 through the pipe 25 and is transferred, on having been concentrated by the disk evaporators, to the rotary furnace 2 through the conduit 26. The brands obtained here are removed at 27 and introduced into the melting furnace 1 at 28. The recovered alkali is removed from the furnace 1 through the conduit 29.

In some plants the lye is concentrated, prior to entering the rotary furnace, with the aid of steam in multiple effect evaporators. By this arrangement, a part of the heat generated in the combustion of the organic substance may be utilized for generation of steam.

Such an arrangement is shown in Fig. 2 where 1 designates a melting furnace, 2 a rotary furnace, 5 a steam boiler connected thereto, 6 an economizer, and 4 the chimney. Connected to the steam boiler 5 is a system of evaporators 7 with a condenser 8 and a vacuum pump 9. From the steam pipe leading to the evaporators 7 a conduit 30 may be branched out for other purposes. The lye is supplied to the evaporators 7 through the pipe 31, passes through the evaporators, which are arranged in series, and escapes through the conduit 32 to the rotary furnace 2, from which the brands are removed at 27. The brands are introduced into the melting furnace 1 at 28, and the alkali is removed at 29.

This system, however, involves considerable disadvantages which must be offset against the advantages in regard to the utilization of the heat.

The combustion process in the melting furnace 1 is well-nigh uncontrollable and very irregular, and hence, the steam generation of the boiler 5 will also be exceedingly irregular (only an average steam generation of about 60% being entirely constant), the result of this being that extensive equalizing means, such as steam accumulators, must be made use of. As the boilers have to be placed behind the rotary furnace proper, where the flue gas temperature is low (about 700° C.), the required boiler surface will be unnecessarily large and quite out of proportion, while the efficiency will be exceedingly low. According to available investigations, the efficiency is about 35%, computed on the effective calorific value of the substance. In addition, a great portion of the generated steam will be consumed for the evaporation of the black lye. For a plant of average size, the quantity of steam required for evaporation amounts to about 40% of the total quantity of steam generated by the rotary furnace boilers. The boilers will thus be loaded with a steam generation which will not be in favor of the other stages in manufacture. Obviously, these costs will raise the price of the usefully produced quantity of steam to a considerable extent.

The evaporating plant in itself is also a most expensive one, the same requiring an entirely constant supply of steam. In addition, its maintenance and operation are rendered expensive by reason of incrustations that may occur.

It will be evident from the foregoing statements that the economical and thermal results of the lye regenerating process should be improved very materially, if only the actual problem of evaporation could be solved in a more simple manner than hitherto.

This is facilitated by the method according to the present invention, which principally consists in that the heat of flue gases is utilized for the evaporation, by indirect heating, to temperatures falling below the saturation temperatures of these gases. The lyes are hence indirectly heated while their concentration remains unchanged, but are cooled by direct contact with the gases.

In the rotary furnace, such as it is arranged in some plants and where, consequently, no heat is taken from the flue gases in the form of steam, the major portion of the quantity of heat liberated in the combustion process will be found in the form of steam generating heat in the steam evaporated from the lye and escaping with the flue gases. This heat may for the most part be utilized directly for evaporating purposes.

An arrangement for carrying this method into effect is shown diagrammatically in Fig. 3 of the drawings.

In this figure, 1 is a melting furnace, 2 a rotary furnace and 3 rotary disk evaporators, as in Fig. 1. The mixture of flue gases and vapor is driven from the evaporators by means of a fan 33 through a saturator 10 and then, before it reaches the chimney 4, through a heater 11. Connected to the heater 11 through supply and return pipings 12 and 13 is an evaporator 14, the circulation of the lye between the heater 11 and the evaporator 14 being maintained by means of a pump 34. A portion of the lye concentrated in the evaporator 14 is conveyed through a conduit 35 to the disk evaporators 3.

The mixture of air or gas and vapor escaping from the evaporator 14 is here conducted through a conduit 15 to a second heater 16, which is connected by means of supply and return pipings 17 and 18 to an evaporator 19, whence the gas-vapor mixture escapes through the conduit 20. Here, too, a pump 36 is arranged to maintain the circulation, by means of which pump a portion of the lye supplied through the pipe 37 and concentrated in the evaporator 19 is also transferred to the evaporator 14 through a conduit 38. Air is introduced into the evaporators 14 and 19 at 21 and 22, respectively, for instance by means of fans 39 and 40. Connecting the conduit to the chimney and the conduit 15 to the heaters 16 is a conduit 23, through which gas-vapor mixture is conducted from the heater 11, said mixture being used, if desired, as a heating medium in the heater 16. This medium may be driven onward by means of the fan 33 driving the air through the saturator 10 and the heater 11 by adjusting the damper 43. The air-vapor mixture from the evaporator 14, from the heater 16 and from the evaporator 19, respectively, may be conducted to the furnace 1 in place of fresh air or leak-air.

The flue gas-vapor mixture which, if desired, is first saturated with steam in the saturator 10, is cooled indirectly to so low a temperature that steam is condensed, and here the cooling agent consists of the liquid to be concentrated, that is to say black-lye, which liquid thus absorbs the steam generating heat liberated in condensation. This takes place in the heater 11. The liquid which has then been heated is again cooled, in that air or other gas, or a gas mixture of a saturation temperature lower than the temperature of the liquid, is in a suitable manner caused to evaporate water from the lye. This is effected in the evaporator 14, for instance by the gas being forced through the liquid. After the liquid has been cooled in the evaporator 14, it returns through the conduit 13 in order to be heated anew by the flue gas-vapor mixture in the heater 11, and so forth. Preferably, both the heating and the evaporation take place while flowing the heating and cooling media counter to the flow of the lye. The heater 11 and the evaporator 14 thus may be said to form an evaporating unit. The mixture of air or gas and vapor obtained in the evaporation from the evaporator 14 may, if its temperature is not too low, be utilized in a succeeding apparatus, i. e. in the same manner as above stated in regard to the original flue gas-vapor mixture. This is effected, as shown in Fig. 3, by the gas-vapor from the evaporator 14 being caused to give off heat indirectly in a second heater 16 to a lye which is conducted through the conduit 17 to a second evaporator 19, wherein it is cooled by means of fresh air or gas, whereupon the lye returns to the heater 16 through the conduit 18. Thus the heater 16 and the evaporator 19 form a second evaporating unit corresponding to a second "effect" in the ordinary multiple effect evaporating apparatus. The gas-vapor mixture escaping from the heater 11 to the chimney 4 may also be used as a heat deliverer in the heater 16, inasmuch as the latter will obviously operate at a lower temperature than the heater 11. The said gas-vapor mixture is conducted through the conduit 23 to the heater 16. Similarly, it is possible to continue with a third evaporating unit, and so forth. These various units will obviously operate at different temperature intervals. The gases and the air are driven onward, as shown, preferably by means of fans.

The temperature of the flue gas escaping from the disk evaporators 3 varies considerably, but is generally believed to be between 100° and 200° C. The saturation temperature of the flue gases, that is say the temperature at which condensation commences to occur upon cooling, varies considerably. Its highest value is believed to be between 80° and 90° C. Inasmuch as the gases must be cooled to condensing temperature, in order to attain an effective heat transmission in the indirect exchange of heat, it is preferred to cool the gases prior to this indirect exchange of heat, for instance, by causing the gases to pass through a liquid layer on a suitably perforated partition, which may take place in the saturator 10. This liquid layer may consist of lye; if this be the case the heat of superheat of the gases is used for evaporation. Water may also be employed, however, and it is preferred to cause the flue gases, for instance, first to pass through lye and then through water. Injection of lye or of water, respectively, into the gases may also be used to saturate the same.

It is also possible to replace the disk evaporators by saturators, as shown in Fig. 4. Here, as in Fig. 3, 1 denotes the melting furnace, 2 the rotary furnace, 10 the saturator, 11 the heater, 4, the chimney 12 and 13 conduits from the heater to the evaporator 14 into which the lye is introduced through the conduit 37; 15 is the discharge conduit for the air-vapor mixture and 21 the air intake with the fan 39. With this arrangement a very substantial evaporation takes place in the saturator 10, i. e. an evaporation as great as that which takes place according to Fig. 3 in the disk evaporators and the saturator shown therein. An arrangement such as shown in Fig. 4 may also be provided with two or more units of this kind.

As has been found through trials and calculations, it is possible by means of the arrangements above described with only a single unit to again utilize more than 75% of the total heat contents of the flue gases (from the disk evaporators) for evaporation. This is attained by the employment of the unit 11 and 14 of Fig. 3. It is evident that, as 75% more water is thus evaporated per unit of combusted substance, and as the furnace was already nearly self-maintaining before, it is possible, if this evaporating arrangement be used, to deprive the melting furnace 1 of a great portion of the concentrated lye or hands obtained from the rotary furnace 2 proper. This dry substance may instead be used for generation of steam, and the boiler used for this purpose may be "fired" directly with the gases from the melting furnace pertaining to the boiler, that is to say, be disposed immediately behind the furnace, so that the gases will have a higher temperature when reaching the boiler.

If, in addition, the heat of the mixture escaping from the evaporator 14, as in Fig. 3, is also utilized in a second unit 16—19, still more water will be evaporated from the lye. It is possible in this manner to reduce the quantity of heat that must be developed in the furnace, in order to bring about concentration of the lye, to one half (or still less) of the value which is otherwise necessary. Consequently, about half of the dry substance of the lye will be useful for other heating purposes, which in this case involve generation of steam for boiling, drying and other purposes.

An embodiment of this arrangement is shown in Fig. 5. Here, 1a and 1b designate melting furnaces, the gases from the furnace 1a being utilized for generation of steam in a boiler 41, from which they flow further through a saturator 42 to the chimney 4. As in the embodiment according to Fig. 4, the gases from the furnace 1b pass through the rotary furnace 2, the saturator 10 and the heater 11 to the chimney 4. As above described, the evaporator 14 is connected to the heater.

By the concentration of the lye so much water will be removed from the same that not all of the dry substance obtained from the rotary furnace 2, i. e. the brands, is required for the heat demand in the furnace 1b. The quantity of dry substance which thus remains is combusted in the furnace 1a, and the heat then obtained is utilized in the steam boiler 41. A portion of the heat contents of the gases escaping from the boiler may be utilized in the saturator 42, which then operates with lye. The air-vapor mixture which in this case escapes from the saturator 42 has a comparatively low temperature of condensation, for instance about 50° C. This gas-vapor mixture may be used for local heating, drying purposes and the like. It is also possible to use the same for evaporating purposes, in which case the gases are caused to pass through heaters, etc., in the same manner as the gases from the furnace 1b. By reason of the low temperature of condensation of the gases from the saturator 42, however, the quantities of heat that may be recovered here are rather small.

However, the percentage of the total quantity of dry substance which may be utilized in this manner for the generation of steam will be dependent largely on the degree of utilization of the flue gases, whether the evaporating apparatus operates with one or more units, and so forth. An estimation shows, however, that utilization of 70% only of the heat contents of the flue gas-vapor mixture and of a single unit only in the evaporation with air or other gases in the manner herein described gives a thermal result which is quite as favorable as that obtained in the system with evaporating apparatus now in use. In comparison with the latter system, however, the system above described shows a number of considerable advantages, among which the following may be mentioned:

The system is very simple and easily managed for the reason that no pressure above or below atmospheric is used in the apparatus.

The boiler surface required for the generation of steam is reduced by about 40%, corresponding to that part of the boiler surface of the present system which generates steam for the evaporating plant.

The boiler surface required for an efficient steam generation is also reduced to a considerable extent when the boilers are heated directly and the temperature of the flue gas supplied thereto becomes higher in consequence (about 1200° C. against approximately 700° C. for the waste gas boilers according to the statements above). In addition, the efficiency of the boilers will be considerably higher, by reason of this higher flue-gas temperature, than is the case in the present system.

The generation of the steam in the boilers will be much more constant than before, inasmuch as the uncontrollable combustion processes occurring in the rotary furnace proper are avoided.

No incrustation occurs in the system herein suggested, this depending on the fact that the evaporation (formation of the steam) takes place at the free surface of the liquid and not at the heating surface.

Finally, it deserves mentioning that this evaporating arrangement will be much cheaper than the vacuum evaporating system now in use.

Sometimes, however, the disadvantage of very brisk foaming in the evaporator may occur; this will particularly be the case if the black lye is thin and if it contains large quantities of resin-soap. It is preferable, therefore, to separate the soap (in known manner), from the black lye before it is subjected to evaporation, and also to work with a concentration of at least 10° Bé. (90° C.) The foaming is reduced also if the free alkali in the black lye is reduced, for instance by neutralization with acid. Such neutralization may be effected with acid gases, acid liquids or acid salts, for instance. Examples of the first kind are the flue gases in the sulphate lye concentration, which gases contain carbonic acid, sulphurous acid and other acids, and it is consequently preferable here that the black lye to be concentrated, or a portion thereof, be subjected to these gases before or during the concentration, which may take place in the saturator, for instance. An example of acid liquids is to add sulphite waste lye to the black lye. An example of the last-mentioned kind is sodium bisulphate, which in the manufacture of sulphate may be used to cover the losses of alkali, in which case sodium bisulphate is added in suitable quantities to the black lye prior to or during the concentration of the latter.

Obviously, the furnace construction used for the concentration and combustion of the lye is of no consequence to the fundamental principle of the arrangement provided by the present invention. Thus the rotary furnace may be replaced by a gas-producer, and so forth. It is of the greatest interest in each case, however, to keep the saturation temperature of the flue gases as high as possible. This is attained by keeping the quantity of combustion air in the furnace as nearly as possible equal to the theoretically required quantity of air. A further increase of the saturation temperature may be brought about, however, where air is used for the evaporation in the apparatus above described, by conducting the air-vapor mixture, the saturation temperature of which is higher than that of the atmosphere, to the furnace where it is used as combustion air.

The said air-vapor mixture may also be supplied to the system where leakage of air occurs, whereby such air-vapor will be sucked into the leaks in place of ordinary air. By thus supplying air, which is saturated with steam at a tem-